United States Patent [19]

Nagano et al.

[11] Patent Number: 4,809,083
[45] Date of Patent: Feb. 28, 1989

[54] IMAGE READING AND/OR RECORDING APPARATUS WITH ENLARGING AND REDUCING FUNCTION

[75] Inventors: Fumikazu Nagano, Yamatokoriyama; Seiichi Tanaka, Osaka, both of Japan

[73] Assignee: Sharp Kabushiki Kaisha, Osaka, Japan

[21] Appl. No.: 933,386

[22] Filed: Nov. 21, 1986

[30] Foreign Application Priority Data

Nov. 27, 1985 [JP] Japan .................................. 60-268009

[51] Int. Cl.$^4$ .............................................. H04N 1/04
[52] U.S. Cl. .................................... 358/287; 358/77; 382/47
[58] Field of Search ...................... 358/287, 77; 382/47

[56] References Cited

U.S. PATENT DOCUMENTS

| | | | |
|---|---|---|---|
| 4,564,865 | 1/1986 | Yamada | 358/287 |
| 4,630,947 | 12/1986 | Yoshida et al. | 358/287 |
| 4,682,243 | 7/1987 | Hatayama | 358/287 |
| 4,686,580 | 8/1987 | Kato et al. | 358/287 |

FOREIGN PATENT DOCUMENTS

| | | |
|---|---|---|
| 0137208 | 4/1985 | European Pat. Off. . |
| 2006567 | 8/1978 | United Kingdom . |
| 2134350 | 1/1984 | United Kingdom . |

Primary Examiner—Edward L. Coles, Sr.
Attorney, Agent, or Firm—Birch, Stewart, Kolasch & Birch

[57] ABSTRACT

A method of enlarging or reducing an image at a desired magnification in an image reading and/or recording apparatus. The feature of the present invention resides in first deciding the integral part a and the decimal part d of a value A corresponding to the desired magnification Z, then forming a single readout pixel by averaging a pieces of basic pixels read out from an original, and subsequently using the decimal part d as a correction value for each readout pixel and deleting one basic readout pixel every time the value of the decimal part accumulated with respect to the individual readout pixels exceeds 1, thereby continuously varying the ratio of the reading resolution to the recording density to execute enlargement or reduction of the image at the desired magnification.

2 Claims, 3 Drawing Sheets

IMAGE READING AND/OR RECORDING APPARATUS WITH ENLARGING AND REDUCING FUNCTION

BACKGROUND OF THE INVENTION

The present invention relates to an apparatus for reading and/or recording an image in a facsimile or the like and, more particularly, to such apparatus and method capable of enlarging and reducing an image at a desired magnification.

It has been customary in the prior art heretofore that a desired image magnification in a copying machine or the like is attained by optically enlarging or reducing an original image through a zoom lens. However, such apparatus equipped with a zoom lens is expensive and has a drawback that its image forming capability is inferior to the image value achieved through any lens of a fixed focal length with further disadvantages including a narrow image magnification range and the necessity of a mechanical device for driving the zoom lens, whereby the mechanism is rendered structurally complicated.

SUMMARY OF THE INVENTION

The present invention has been accomplished in an attempt to eliminate the problems mentioned above. The principal object of the present invention resides in providing an image reading and/or recording apparatus and a method thereof which are capable of enlarging and reducing an original image at any desired magnification in a wide range without the necessity of employing a zoom lens.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

For the purpose of attaining the objects mentioned above, an exemplary image reading and/or recording apparatus embodying the present invention is so contrived that, under the condition where a value A having an integral part a and a decimal part d corresponds to a desired magnification Z, a single readout pixel is formed by averaging a pieces of basic pixels read out from an original and, with the decimal part d used as a correction value for each readout pixel, one basic readout pixel is selectively deleted every time the value of such decimal part accumulated with respect to the individual readout pixels exceeds 1, whereby the ratio of the reading resolution to the recording density is continuously varied to enlarge or reduce the image at a desired magnification.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3 (b) shows the principle of operation on both reading and recording sides when an image is enlarged in accordance with the time chart of FIG. 3 (a).

DETAILED DESCRIPTION OF THE INVENTION

Figure 1:
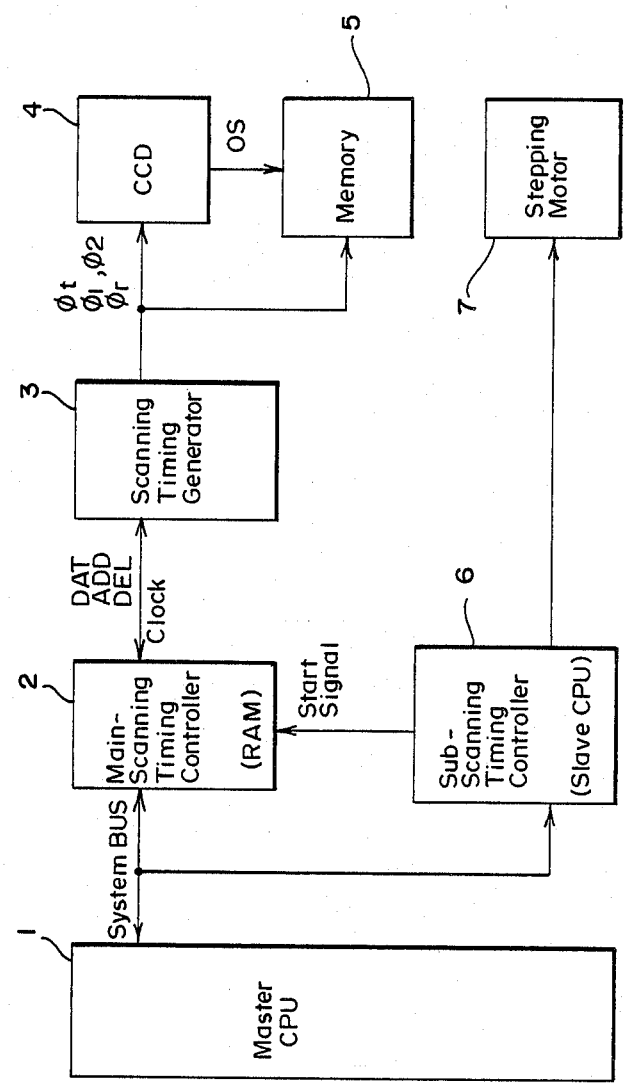
FIG. 1 is a control block diagram of an exemplary image reading and/or recording apparatus embodying the present invention.

Prior to describing an exemplary image reading and/or recording apparatus embodying the present invention, an explanation will be given first on the principle of operation thereof.

In the present invention, image data are read out by a solid-state pickup element in an image reading and/or recording apparatus such as a facsimile or scanner printer, and the image is enlarged or reduced at a desired magnification in a wide range by continuously changing the ratio of the reading resolution to the recording density.

An image magnification Z is represented by the ratio of the readout length of the original image to the recording length thereof when actually printed.

$$Z = \frac{[\text{Recording length}]}{[\text{Readout length}]} = \frac{(1/D)n}{(1/R)n} = \frac{R}{D} \quad (1)$$

where,
R: reading resolution
D: recording density
n: number of pixels Accordingly, enlargement and reduction of the image can be realized by varying the ratio of the reading resolution R to the recording density D as in the following three cases.

(A) The reading resolution R is varied while the recording density D is maintained constant.

(B) The reading resolution R is maintained constant while
the recording density is varied.

(C) Both the reading resolution R and the recording density D are varied.

In the embodiment that will be described below, the reading resolution R is rendered variable to a desired value by averaging or selectively deleting basic pixels of the number at the basic reading resolution $R_o$, while the recording density D is retained at a fixed value.

As for varying the reading resolution R, the following procedure is executed.

The number of average pixels plus the number of deletion pixels a+d (where a is an integral part and d is a decimal part) for obtaining a desired reading resolution R given by the aforesaid Eq. (1) and the basic reading resolution $R_o$ as:

$$a + d = \frac{(1/R)}{(1/R_o)} = \frac{R_o}{ZD} \quad (2)$$

With the integral part a defined as the number of steady average pixels, a pieces of continuous basic readout pixels are averaged to form a single readout pixel. Meanwhile, the decimal part d used as a correction component for a single readout pixel is accumulated with respect to individual readout pixels, and one basic pixel is deleted every time the sum of such accumulated correction components d exceeds 1. And thus a desired reading resolution is achieved by the above procedure.

The same result as the foregoing can be attained by setting the integral part a as a combined term of the steady average and the steady deletion or setting the decimal part d as an average correction term, instead of limiting the integral part a and the decimal part d respectively to the steady average term and the deletion correction term.

In the present invention, the actually realizable range of image enlargement and reduction is basically given by $$Z \leq \frac{R_o}{D} \quad (3)$$

On the condition that deterioration of the image quality is neglected, there exists no restriction with regard to the image reduction ratio. As for the accuracy of the magnification, it is limited merely by the precision of computation in the case of calculating the above values a and d by a central processing unit (CPU), so that from a broad view, there is no limit in realizing any accuracy of the magnification.

FIG. 1 is a control block diagram of an exemplary image reading and/or recording apparatus embodying the present invention with a circuit configuration for attaining a desired reading resolution by averaging or selectively deleting basic pixels.

As shown, the apparatus includes a master CPU (central processing unit) 1 for controlling individual control circuits through a system bus as will be described below; a main-scanning timing controller 2 for enabling an image pickup element to scan an original in a predetermined timed relation, the controller 2 consisting of a timing RAM (random access memory) 21, an address counter 22, a latch 23 and a switching circuit 24; a main-scanning timing generator 3 fed with a timing control signal and so forth from the main-scanning timing controller 2; a charge-coupled device (CCD) 4 composed of a one-dimensional image pickup element and functioning in response to the scanning signal from the timing generator 3; a memory 5 for storing a video signal input from the CCD 4; and a sub-scanning timing controller 6 for controlling a stepping motor 7 and so forth to move an original or an optical system so as to read out the entire image of the original. A start signal output from the sub-scanning timing controller 3 is fed to the main-scanning timing controller 2.

In the main-scanning timing controller 2, the timing RAM 21 is accessible from both the master CPU 1 and the address counter 22 by means of the switching circuit 24, and the addresses of the timing RAM 21 thus accessed correspond sequentially to individual pixels of the CCD 4.

Now summarizing the operation, first the master CPU 1 computes the steady average term a and the decimal part d according to Eq. (2) on the basis of the magnification Z fed from an unshown input unit such as a panel and then writes average data ADD and deletion data DEL, which are obtained by calculation, in the addresses of the timing RAM 21 corresponding to the individual pixels of the CCD 4. Subsequently, the timing RAM 21 is switched by the switching circuit 24, so that the address data written in the timing RAM 21 are scanned with access from the address counter 22. Consequently, in accordance with the average data ADD and the deletion data DEL written in the timing RAM 21, the basic pixel data OS output from the CCD 4 are averaged and deleted to obtain a desired reading resolution R.

Figure 2:
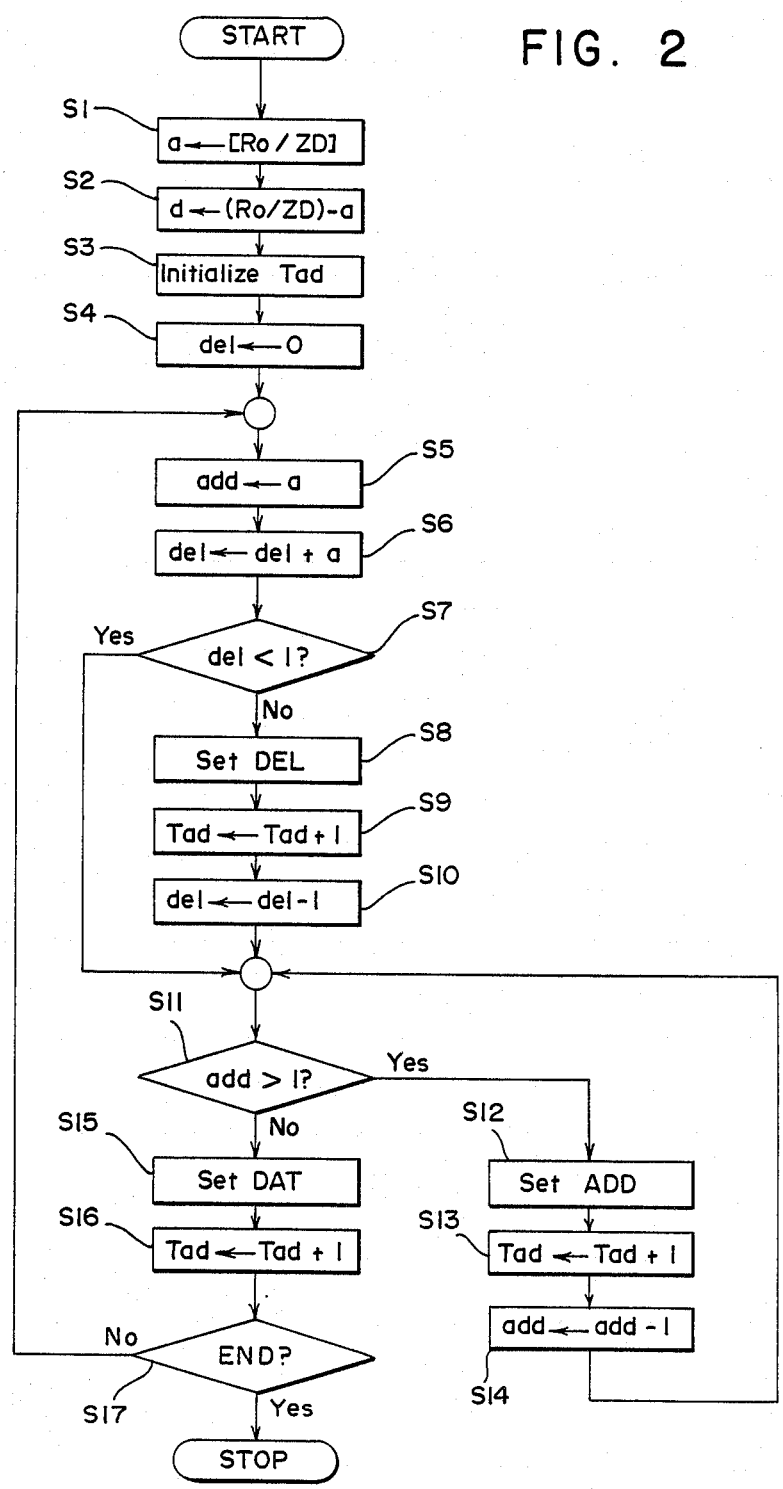
FIG. 2 is a flow chart showing how to obtain average data and deletion data in the control block of FIG. 1.

FIG. 2 is a flow chart showing the procedure executed by the master CPU 1 to produce average data ADD and deletion data DEL.

First in step S1, the number a of average pixels is calculated from the decimal-part discard value of $R_o/ZD$ according to a combination of the basic reading resolution $R_o$, the recording density D and the input magnification Z. The value a is subtracted from $R_o/ZD$ in step S2, whereby the number d of deletion pixels is obtained from the decimal part of $R_o/ZD$. The address Tad of the timing RAM 21 is initialized in step S3, and a deletion cumulative register del is set at zero in step S4. Subsequently, the average pixel number a is set in the average pixel register add in step S5, and the deletion pixel number d is added to the deletion cumulative register in step S6. Whether the content of the deletion cumulative register is smaller than 1 or not is decided in step S7 and, in the case where the value is less than 1, the procedure advances to step S11. However, when the content of the deletion cumulative register has exceeded 1, deletion data DEL is written in the address of the timing RAM 21 in step S8, so that the address is renewed by one in step S9, and a value 1 is subtracted from the content of the deletion cumulative register.

Whether the content of the average pixel number register add is greater than 1 or not is decided in step S11 and, in the case where the value is more than 1, average data ADD is written in a predetermined address of the timing RAM 21 in step S12. Accordingly the address of the timing RAM 21 is renewed with the subtraction of a value 1 from the content of the average pixel number register add in step 14, and the procedure returns to step S11. Meanwhile, if the content of the average pixel number register add is less than 1, the procedure advances from step S11 to step S15 where data information DAT is written in the timing RAM 21, so that the address of the timing RAM 21 is renewed in step 16. The end of operation is checked in step S17 and, if not, the procedure returns to step S5.

Figure 3A:
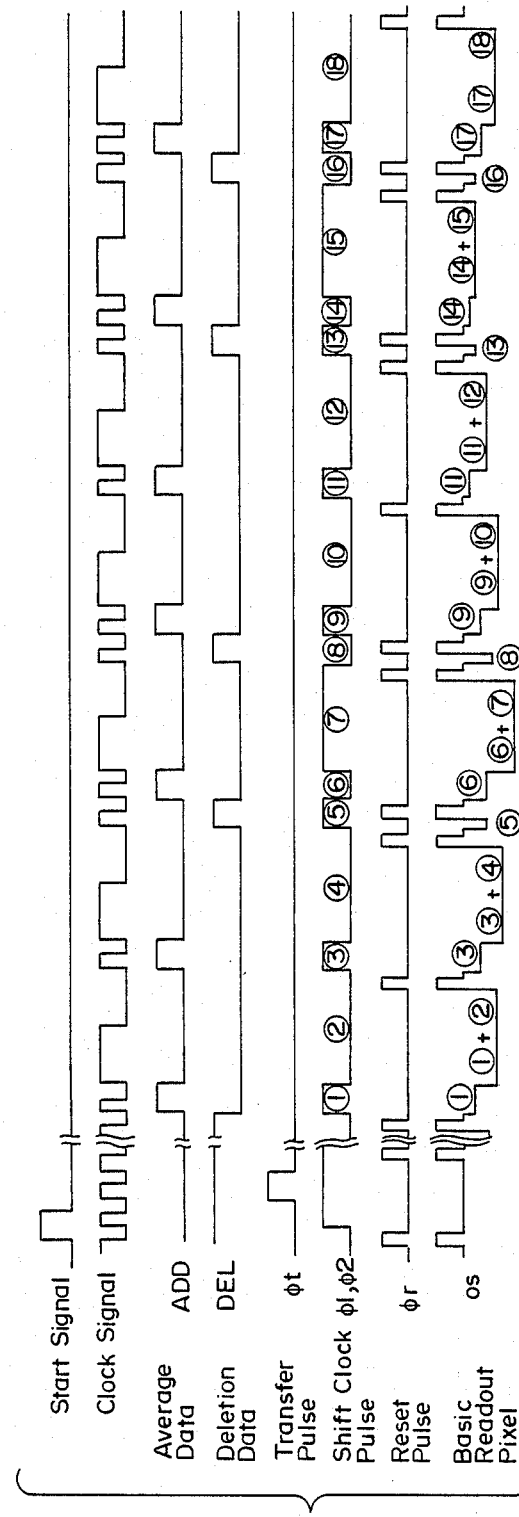
FIG. 3 (a) is a time chart showing a start signal through basic readout pixels to explain the operation in the block diagram of FIG. 1.
Figure 3B:
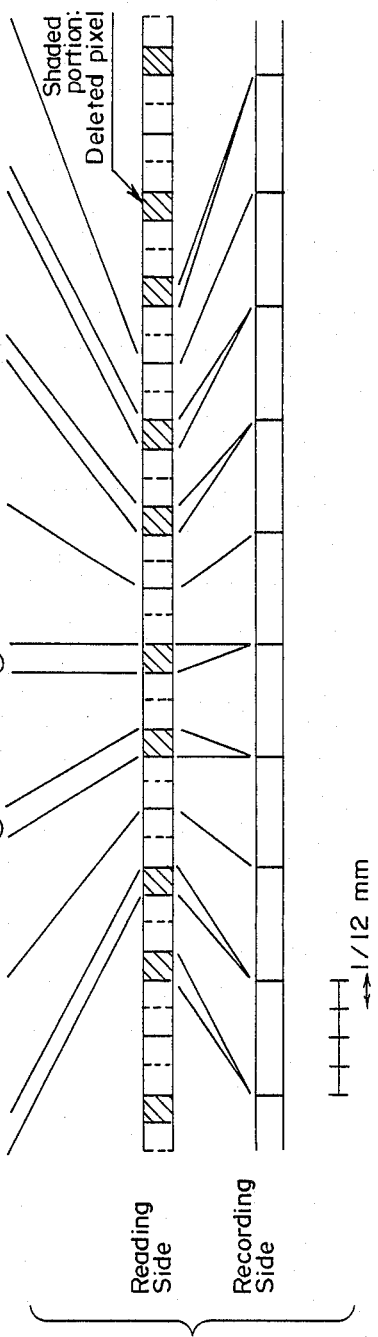

The upper half of FIG. 3 showing a time chart of the start signal through the basic read pixels represents conversion timing of the reading resolution when the magnification Z is established to be 1.5 in an image recording/reading apparatus where the basic reading resolution is 12 dots/mm and the recording density is 3 dots/mm.

Since a=2 and d=0.666... in this case according to Eq. (2), it follows that two basic readout pixels are averaged to form a single readout pixel, and two basic readout pixels are selectively deleted without succession out of three readout pixels.

When a start signal outputted from the subscanning timing controller 6 is fed to the main-scanning timing controller 2, the address counter of the timing RAM 21 is cleared and then clock signals output from the main-scanning timing generator 3 begin to be counted by the address counter 22, whereby the timing RAM 21 is accessed. Consequently, the average data ADD, deletion data DEL and data information DAT written in the addresses of the timing RAM 21 by the master CPU 1 are read out therefrom by the address counter 22. Furthermore, a transfer pulse $\phi t$ for the CCD 4 is formed from the start signal while shift clock pulses $\phi 1$ and $\phi 2$ for the CCD 4 are formed from the clock signal, whereby the addresses of the timing RAM 21 are made to correspond sequentially to the individual pixels of the CCD 4. When the average data ADD is output from the timing RAM 21, the basic pixel data OS is averaged in a state where a reset pulse $\phi r$ for the corresponding pixel of the CCD 4 is not output from the main-scanning timing generator 3. Meanwhile, when the deletion data DEL is output, a reset pulse $\phi r$ is produced to execute deletion without sampling the basic pixel data OS.

In case both the average data ADD and the deletion data DEL are outputted, the time for the data processing is not required including sample-and-hold of the basic pixel data OS, analog-to-digital conversion and data writing in the memory 5. Accordingly, the frequency of the clock signal is increased as compared with that in the case of sampling the basic pixel data OS, and also the frequencies of clock pulses $\phi 1$, $\phi 2$ and $\phi r$ for counting the addresses of the timing RAM 21 and the CCD 4 are increased as well to eventually shorten the data output time of the CCD 4.

The time chart shown in the lower half of FIG. 3 illustrates the principle of enlarging the image in relation to the timing shown in the upper half of FIG. 3. On the reading side, blank portions represent pixels averaged at a basic reading resolution of 12 dots/mm, and shaded portions represent deleted pixels. In this case, the recording density on the recording side is 3 dots/mm and it is extendable up to four times.

The sub-scanning timing controller 6 consists of a slave CPU or the like and functions to average or delete the scanning lines in response to the data from the master CPU 1 in the same manner as in the main scanning direction, thereby achieving a desired reading resolution.

With regard to the sub-scanning direction, the following procedures (1) through (3) may also be adopted.

(1) The scanning time in the main-scanning direction is maintained constant while the scanning time in the sub-scanning direction is varied.

(2) The scanning time in the main-scanning direction is varied in accordance with the magnification while the scanning time in the sub-scanning direction is maintained constant.

(3) The scanning times in both the main- and sub-scanning directions are varied in accordance with the magnification.

Thus it becomes possible to change the magnification in each of the main- and sub-scanning directions.

As described hereinabove, in the image reading and/or recording apparatus of the present invention which reads out an image while averaging and selectively deleting the basic pixels, the ratio of the reading resolution to the recording density is continuously varied to enlarge or reduce the image at a desired magnification. Consequently, the necessity of using an expensive lens can be eliminated for image enlargement or reduction, and it becomes possible to employ a lens of a fixed focal length having satisfactory image-forming capability, hence simplifying the mechanism as well as accomplishing a lower cost and a smaller size with another advantage of widening the magnification range.

While only certain embodiments of the present invention have been described, it will be apparent to those skilled in the art that various changes and modifications may be made therein without departing from the spirit and scope of the present invention as claimed.

What is claimed is:

1. An image reading and/or recording apparatus comprising:
   means for determining an integral part a and a decimal part d of a value corresponding to a desired magnification Z;
   means for forming a single readout pixel by averaging a pieces of basic pixels read out from an original;
   means for using said decimal part d as a correction value for each readout pixel and calculating an accumulated correction value with respect to individual readout pixels;
   means for deleting one basic readout pixel every time the value from said calculating means exceeds 1; and
   means for enlarging or reducing the image at a desired magnification by continuously varying a ratio of a reading resolution to the a recording density in accordance with an output of said deleting means.

2. A method of enlarging or reducing an image at a desired magnification in an image reading and/or recording apparatus, said method comprising the steps of:
   (a) deciding an integral part a and a decimal part d of a value A corresponding to a desired magnification Z;
   (b) forming a single readout pixel by averaging a pieces of basic pixels read out from an original; and
   (c) using said decimal part d as a correction value for each readout pixel and deleting one basic readout pixel every time the value of said decimal part accumulated with respect to individual readout pixels exceeds 1, thereby continuously varying a radio of a reading resolution to a recording density to execute enlargement or reduction of the image at said desired magnification.

* * * * *